United States Patent
König (10) Patent No.: US 7,761,204 B2
(45) Date of Patent: Jul. 20, 2010

(54) MULTI-MODAL DATA INPUT (75) Inventor: Lars König, Ulm (DE)

(73) Assignee: Harman Becker Automotive Systems GmbH, Karlsruhe (DE)

( * ) Notice: Subject to any disclaimer, the term of this patent is extended or adjusted under 35 U.S.C. 154(b) by 1483 days.

(21) Appl. No.: 11/045,852

(22) Filed: Jan. 27, 2005

(65) Prior Publication Data

US 2005/0171664 A1     Aug. 4, 2005

(30) Foreign Application Priority Data

Jan. 29, 2004    (EP) ................... 04001948

(51) Int. Cl.
| | |
|---|---|
| G06F 7/00 | (2006.01) |
| G08B 3/00 | (2006.01) |
| H04B 3/36 | (2006.01) |
| G06F 13/42 | (2006.01) |
| G08G 1/07 | (2006.01) |
| B60Q 1/48 | (2006.01) |
| G08G 1/14 | (2006.01) |

(52) U.S. Cl. .................. 701/36; 340/384.1; 340/407.1; 340/825; 340/906; 340/932.2

(58) Field of Classification Search ........................ None
See application file for complete search history.

(56) References Cited

U.S. PATENT DOCUMENTS

| | | | |
|---|---|---|---|
| 4,827,520 A | 5/1989 | Zeinstra | |
| 6,012,030 A | 1/2000 | French-St. George et al. | |
| 6,041,300 A | 3/2000 | Ittycheriah et al. | |
| 6,073,013 A | 6/2000 | Agre et al. | |
| 6,073,101 A | 6/2000 | Maes | |
| 6,088,671 A | 7/2000 | Gould et al. | |
| 6,138,098 A | 10/2000 | Shieber et al. | |
| 6,169,789 B1 | 1/2001 | Rao et al. | |
| 6,173,266 B1 | 1/2001 | Marx et al. | |
| 6,208,932 B1 | 3/2001 | Ohmura et al. | |
| 6,236,968 B1 | 5/2001 | Kanevsky et al. | |
| 6,246,981 B1 | 6/2001 | Papineni et al. | |
| 6,345,254 B1 | 2/2002 | Lewis et al. | |
| 6,393,403 B1 | 5/2002 | Majaniemi | |
| 6,396,481 B1 | 5/2002 | Challa et al. | |
| 6,411,934 B1 | 6/2002 | Moller et al. | |

(Continued)

FOREIGN PATENT DOCUMENTS

EP    0 911 808 A1    4/1999

(Continued)

OTHER PUBLICATIONS

European Search Report, Patent Application No. EP 04 00 1948, Dated Apr. 19, 2004, 2 pages.

(Continued)

*Primary Examiner*—Khoi Tran
*Assistant Examiner*—Nicholas Kiswanto (57) ABSTRACT

A control system processes commands received from a user. The control system may control one or more devices within a vehicle. A switch allows the control system to choose one of multiple input channels. The method that receives the data selects a channel through a process that minimizes data losses. The switching occurs upon a user request, when the control system does not recognize an input, or when an interference masks a user request.

27 Claims, 5 Drawing Sheets

U.S. PATENT DOCUMENTS

| | | | |
|---|---|---|---|
| 6,422,522 B1 | 7/2002 | Woollen | |
| 6,438,523 B1* | 8/2002 | Oberteuffer et al. | 704/270 |
| 6,453,020 B1 | 9/2002 | Hughes et al. | |
| 6,496,799 B1 | 12/2002 | Pickering | |
| 6,499,015 B2 | 12/2002 | Brooks et al. | |
| 6,505,155 B1 | 1/2003 | Vanbuskirk et al. | |
| 6,594,630 B1 | 7/2003 | Zlokarnik et al. | |
| 6,598,020 B1 | 7/2003 | Kleindienst et al. | |
| 6,601,029 B1 | 7/2003 | Pickering | |
| 6,654,720 B1 | 11/2003 | Graham et al. | |
| 6,658,388 B1 | 12/2003 | Kleindienst et al. | |
| 6,704,396 B2 | 3/2004 | Parolkar et al. | |
| 6,721,633 B2 | 4/2004 | Funk et al. | |
| 6,741,963 B1 | 5/2004 | Badt et al. | |
| 6,748,361 B1 | 6/2004 | Comerford et al. | |
| 6,785,651 B1 | 8/2004 | Wang | |
| 6,801,897 B2 | 10/2004 | Kist et al. | |
| 6,832,196 B2 | 12/2004 | Reich | |
| 6,839,670 B1 | 1/2005 | Stammler et al. | |
| 6,895,242 B2 | 5/2005 | Fu et al. | |
| 6,907,119 B2 | 6/2005 | Case et al. | |
| 6,922,200 B1 | 7/2005 | Marques | |
| 6,925,495 B2 | 8/2005 | Hegde et al. | |
| 6,931,446 B1 | 8/2005 | Cox et al. | |
| 6,950,793 B2 | 9/2005 | Ross et al. | |
| 6,985,850 B1 | 1/2006 | Scanlan | |
| 6,996,426 B2 | 2/2006 | Granberg | |
| 7,085,723 B2 | 8/2006 | Ross et al. | |
| 7,099,829 B2 | 8/2006 | Gomez | |
| 7,127,402 B2 | 10/2006 | Ross et al. | |
| 7,146,323 B2 | 12/2006 | Guenther et al. | |
| 7,158,871 B1* | 1/2007 | Ilan et al. | 701/49 |
| 7,171,365 B2 | 1/2007 | Cooper et al. | |
| 7,174,298 B2 | 2/2007 | Sharma | |
| 7,197,331 B2 | 3/2007 | Anastasakos et al. | |
| 7,254,539 B2 | 8/2007 | Carberry et al. | |
| 7,257,537 B2 | 8/2007 | Ross et al. | |
| 2002/0065584 A1 | 5/2002 | Kellner et al. | |
| 2002/0067839 A1 | 6/2002 | Heinrich | |
| 2002/0198699 A1 | 12/2002 | Greene et al. | |
| 2003/0004725 A1 | 1/2003 | Agapi et al. | |
| 2003/0005159 A1 | 1/2003 | Kumhyr | |
| 2003/0040899 A1 | 2/2003 | Ogilvie | |
| 2003/0126330 A1* | 7/2003 | Balasuriya | 710/107 |
| 2003/0191646 A1 | 10/2003 | D'Avello et al. | |
| 2004/0078762 A1 | 4/2004 | Lee et al. | |
| 2004/0167770 A1 | 8/2004 | Zhuo et al. | |
| 2004/0194099 A1 | 9/2004 | Lamping et al. | |
| 2004/0198326 A1 | 10/2004 | Hirani | |
| 2004/0243419 A1 | 12/2004 | Wang | |
| 2004/0249638 A1 | 12/2004 | Wang | |
| 2004/0264672 A1 | 12/2004 | Paek et al. | |
| 2006/0079332 A1 | 4/2006 | Bishop | |

FOREIGN PATENT DOCUMENTS

| | | |
|---|---|---|
| EP | 1 054 390 A2 | 5/2000 |
| EP | 1 063 636 A2 | 12/2000 |
| EP | 1 231 798 A2 | 8/2002 |
| EP | 1 524 778 A1 | 4/2005 |
| FR | 2 808 915 A1 | 11/2001 |
| GB | 2 343 779 A | 5/2000 |
| GB | 2 372 864 A | 9/2002 |
| WO | WO 99/57648 | 11/1999 |
| WO | WO 99/57648 A1 | 11/1999 |
| WO | WO 00-52921 A2 | 9/2000 |
| WO | WO 01-41490 A1 | 6/2001 |
| WO | WO 02-05264 A1 | 1/2002 |
| WO | WO 02-087098 A1 | 10/2002 |

OTHER PUBLICATIONS

H. Maes, Stephane et al. Editors, W3C "Multimodal Interaction Requirements", XP-002271304, obtained from the Internet at, http://www.w3.org/TR/2003/NOTE-mmi-reqs-20030108 on Feb. 24, 2004, pp. 1-37.

Hickey, Marianne, Editor, W3C "Multimodal Requirements for Voice Markup Languages", XP-002271602, obtained from the internet at, http://www.w3.org/TR/2000/WD-multimodal-reqs-20000710 on Feb. 26, 2004, pp. 1-17.

Kuhn et al., "Learning Speech Semantics with Keyword Classification Trees," CRIM, School of Computer Science, McGill University, Montreal, Quebec, Canada H3A 2A7, Apr. 1993, pp. 1155-1158.

McGlashan, Scott at al., Editors, W3C "Voice Extensible Markup Language (VoiceXML) Version 2.0", XP-002248286, obtained from the internet at, http://www.w3.org/TR/voicexml on Jul. 18, 2003, pp. 1-80.

McGlashan, Scott et al., Editors, W3C "Voice Extensible Markup Language (VoiceXML) Version 2.0", XP-002248286, obtained from the Internet at, http://www.w3.org/TR/voicexml on Jul. 18, 2003, pp. 81-161.

Rudnicky at al., "Spoken Language Recognition in an Office Management Domain," ICASSP 91, vol. 2, 1991 International Conference on Acoustics, Speech, and Signal Processing, May 14-17, 1991, pp. 829-832.

S P A Ringland et al. "Multimodality—the future of the wireless user interface", XP-001171240, BT Technology Journal, vol. 21, No. 3, Jul. 2003, pp. 181-191.

* cited by examiner

MULTI-MODAL DATA INPUT

BACKGROUND OF THE INVENTION

1. Priority claim

This application claims the benefit of European Application No. 04001948.1, filed on Jan. 29, 2004. The disclosure of the above application is incorporated herein by reference.

2. Technical Field

The invention relates to a speech dialogue system, in particular, to a speech dialogue system with multiple input channels.

3. Related Art

Some dialogue systems accept speech commands that control electronic devices and systems. The dialogue system analyzes input and directs the commands to specific electronic devices.

Some dialogue devices are useful in vehicles. To reduce the risk of accidents, some car manufacturers provide dialogue systems within vehicles. The electronic systems may be operated using various inputs.

These input devices are not easy to use. When activated, a user may not be able to use the system due to high noise levels. Accordingly, there is need for a system that allows the user to input instructions through multiple input methods without losing the previously submitted instructions.

SUMMARY

A control system includes an audio channel and a haptic channel used to control an electronic device in a vehicle. A switch may be used to select the audio channel and the haptic channel. The switch may be activated by a user or by a control system. The control system may be configured to automatically switch from the audio channel to the haptic channel when the data is received through the audio channel and the control system detects an interference greater than a predetermined threshold level.

A method for receiving control data including an electronic device is connected to a control system in a vehicle. The method may receive input data through a first input channel that may be a haptic or audio input. The method may switch from one input channel to the other when the control system cannot recognize a control command from the input data. The control system may combine the inputs from both channels to form the control command. The method may monitor interference when the audio input channel is active. If the interference is greater than a threshold level, a switching of the channels may occur.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A Speech Dialogue System (control system) may provide multiple methods for receiving data. The user may switch between multiple inputs without losing processed data. The control system may interface with an electronic device or machine converting the voice or speech instructions to commands that will control the devices. The control system also may interface with more than one electronic device such as those devices integrated within or coupled to a vehicle. In a vehicle, the electronic devices may include a radio, a cellular phone, a navigation system, and an air conditioning and heating unit or other controlled modules. Each device may be connected to the control system. The vehicle may be a device or structure for transporting people or items such as a car, bus, recreational vehicle, truck or boat.

Figure 1:
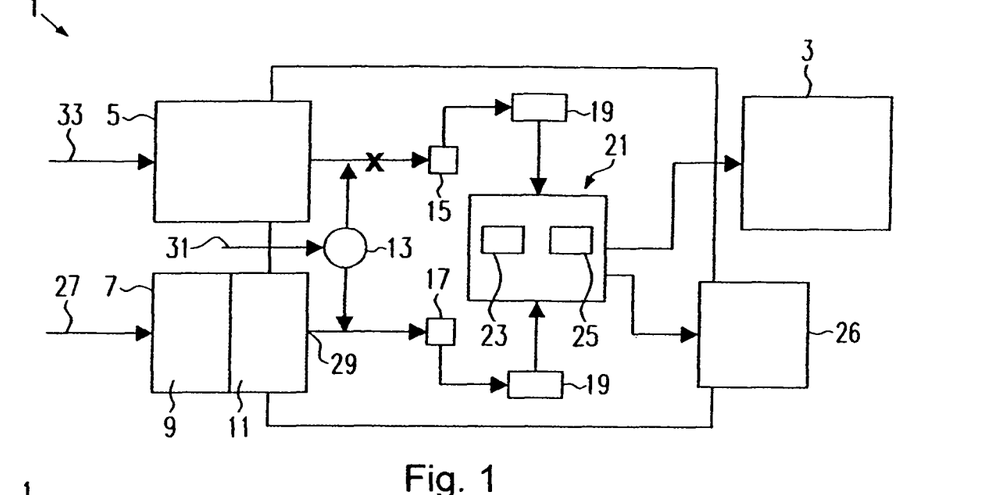
FIG. 1 is a control system configured to receive audio input and haptic input where the audio input channel is active.

FIG. 1 is a block diagram of a control system 1 having two input channels 5 and 7. The control system 1 is connected to an electronic device 3. In FIG. 1, the electronic device 3 may include a compact disk player, a sun roof, a DVD player or any regulating mechanism that might be coupled to a vehicle.

In FIG. 1, the control system 1 is connected to multiple inputs, a haptic or tactile input 5 and an audio input 7. The audio input 7 (audio input channel) may include a device 9 that converts sound into electrical signals or data. A speech recognition device 11 may be connected to the device 9. The microphone 9 may be positioned anywhere in a vehicle such as the headliner or mirror. The speech recognition device 11 may compare the audio inputs with known phrases like a comparator. The control system 1 may include a switch 13 that is connected to the haptic input channel 5 and the audio input channel 7. A data converter 15 and 17 is connected to the haptic input channel 5 and audio input channel 7, respectively, and a memory 19 is connected to the data converter 15 and 17. The memory 19 may be multiple memory devices where information can be stored and retrieved and is connected to the converter 15 and 17 and other devices. The memory 19 may be a solid state memory device such as RAM or flash memory. A command determination device 21 may include a decision unit 23 and a combining unit 25 as shown in FIG. 1. The command determination device 21 may be a processor for processing signals and comparing the signals to other known signals. The command determination device 21 is connected to the electronic device 3. The control system 1 also may include an output device 26. The output device 26 may be connected to an electronic device 3 and it may be integral or a unitary part of the electronic device 3. The command determination device 21 may be connected to the output device 26. The output device 26 may be an acoustical output such as a speaker system or a display such as a multimedia display.

The multiple inputs include a haptic or tactile input channel 5 and an audio input channel 7. The haptic input channel 5 may include control keys, a keyboard, switches, levers or touch screens. The switches and levers may be included on a multimedia display. The audio input channel 7 includes a system to receive audio signals or speech. For example, the audio input channel 7 may include a microphone 9 or another sensor that receives voice or speech and transforms the speech into electrical signal or data. A speech recognition device 11 may analyze the electrical signals received from the microphone 9 and filter out the unidentified speech commands. The speech recognition device 11 may be a device that uses recognition paradigms such as hidden Markov models. Interference or background noise may be received with the speech. The speech recognition device 11 may include filters, noise reduction circuits and/or an echo reduction device so that the speech commands may be extracted from the interference. The recognition device 11 may include comparators to determine whether the interference and background noise is above a threshold value.

The control system 1 may include a switch 13 to switch between the haptic input channel 5 and the audio input channel 7. The switch 13 may be mechanical or electronic. The switch 3 may be a circuit element that chooses one of two or more possible states to isolate the haptic input channel 5, and another switch to isolate the audio input channel 7.

In FIG. 1, the control system 1 may activate the audio input channel 7 if the control system 1 receives a proper input command. When audio input channel 7 is in use and the user switches to the haptic input channel 5, the user may activate a control key 31 or articulate a switching command. The switching command may include the words "key control." If the haptic input channel is in use, the user may switch to the audio input mode by touching or activating a switch, or a push-to-talk lever, placing the control system 1 in an audio mode.

The audio input channel 7 may transmit the audio data to a converter 17. The audio data may include a word or a phrase. The converter 17 converts the audio data into a common data format. For instance, the common data format may include an ASCII data format.

The data received from the haptic input channel 5 may be transmitted to a converter 15. The haptic input may include a character, such as an alpha-numerical character or number. The converter 15 may convert the haptic data into a common data format for the command determination device 21. The converted data may be stored in a memory 19. The conversion of input data into a common format may be accomplished in the components of input channels 5 and 7 such as the speech recognition device 11.

In FIG. 1, the memory 19 may include multiple memories. Alternatively, the memory 19 may be one device that stores the inputs from both input channels 5 and 7. The memory 19 may be a semiconductor memory device like a RAM or flash memory and may include any other type of device where information can be stored or retreived.

A command determination device 21 may include a decision unit 23 and a combining unit 25. The command determination device 21 processes the input data, information and commands from the memory 19 in real or batch time from the input channels 5 and 7. The command determination device 21 may be a processor that compares commands to an array of predetermined commands that are acceptable for use in the electronic devices 3 connected to the system. The command determination device 21 may include a memory that stores the predetermined commands.

The decision unit 23 may decide whether an input received from one input channel is a proper control command. If the decision unit 23 determines that the input data is a proper command that can be processed, the data is processed and directed as a command or information to the appropriate electronic device 3. If the data cannot be processed, the decision unit may request a second input via a second input channel. The switch 13 will change input channels 5 and 7 and receive data from the second input channel 5 and 7. The combining unit 25 may combine the input from the first channel and the second channel. The combination of the two inputs will be checked. If the combination of the input data can be processed, then the completed control command is directed to the appropriate electronic device 3.

The components of the system shown in FIG. 1 may be configured in many ways. For example, the output devices 26 may be shared with the electronic device 3 and the output device 26 even may be integral or a unitary part of the electronic device 3. The placement of the switch 13 on the signal path may be moved to other locations. For example, the switch 13 may isolate (or put in a standby mode) the microphone 9, the speech recognition device 11, or the interface between the microphone 9 and the speech recognition device 11. The switch 13 may be placed anywhere along the input channel 5 and the between the connections to the other components for the haptic channel inputs.

Figure 2:
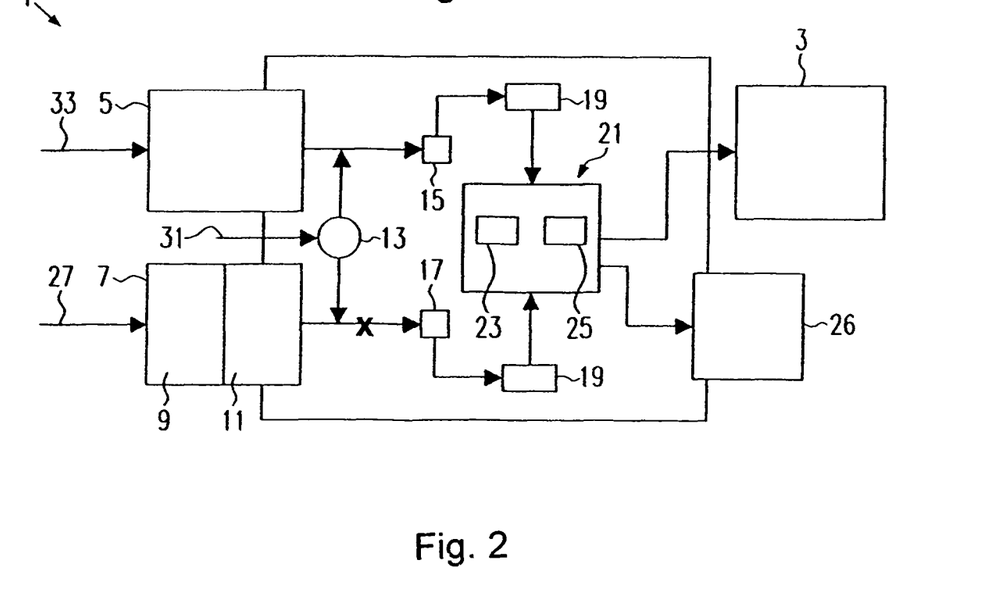
FIG. 2 is a control system configured to receive audio input and haptic input where the haptic input channel is active.

FIG. 1 shows the arrangement of the control system 1 with the audio input channel 7 active. In FIG. 2, the haptic input channel 5 is active. The representation of the active channel is shown with an "X" on the inactive line between the input channels 5 and 7 and the converter 15 and 17, respectively.

The control key 31 for activating the haptic input channel 5 may be on a keyboard or keypad (not shown) which may be part of the haptic input channel 5. When the control key 31 is activated, the switch 13 may switch the input mode to the haptic input channel 5. If the audio input channel 7 is active, a voice command such as "switch to keyboard" may cause the switch 13 to change from the audio input channel 7 to the haptic input channel 5. When the 'push to talk' lever is activated, the switch 13 will return the input mode to audio input channel 7.

A dialogue between a user, the control system 1 and an electronic device 3 may occur when the user presses a push-to-talk lever (not shown) and activates the system 1. When the user activates the push-to-talk lever, the control system 1 will switch to the audio input channel 7. The switch 13 makes a connection between the audio input channel 7 and the converter 17. About the same time, the connection between the haptic input channel 5 and the converter 15 may isolate the haptic input channel. The symbol "X" in FIG. 1 indicates the blocking of haptic input channel 5.

The user may provide speech commands to the microphone 9. The electrical signals generated by the microphone may be processed in the speech recognition device 11 where the processed speech signals are filtered, identified and directed to the converter 17. The converter 17 converts the signals into a recognized data format. The use of the converter 17 may be optional if the speech recognition device 11 converts the speech signals to the common data format. The input data may be stored in a memory 19 and transmitted to the command determination device 21.

The command determination device 21 may use the decision unit 23 to determine whether the speech input corresponds to a control command. A control command is a command that provides the parameters of control to any one of the connected electronic devices 3. The control command may include information such as telephone numbers to be entered into a telephone or a target location for a navigation system. Control commands may include such information as the instruction to call the telephone number or calculate the route to the target destination. If the decision unit 23 determines that the input data matches the control command, then the command is directed to the appropriate electronic device 3.

The output device 26 may provide the user with information that the control command was understood.

When the switching key 31 is activated on the haptic input device 5 or an audio switching command is received, the switch 13 will break the connection between the audio input channel 7 and the converter 17 and make a connection between the haptic input channel 5 and the converter 15 as shown in FIG. 2. The user may provide inputs 33 via the haptic input channel 5, whereas at the same time ongoing audio inputs 27 no longer enter the converter 17, as depicted by the "X" on the connection between the acoustic input channel 7 and the converter 17 in FIG. 2. The haptic informational inputs 33 may be transferred to the converter 15 through the haptic input channel 5. The converter 15 may convert the input data into a common data format. This format of the data may be the same as the data from the converter 17 for the acoustic input data.

The converted input is then stored in a memory device 19 and forwarded to the command determination device 21. The determination device 21 includes a decision unit 23, as previously described. The decision unit 23 may determine whether the input corresponds to a control command. If a correspondence is found, the command may be forwarded to the electronic device 3 for processing, as described previously. If the input does not correspond to the control command, a signal may be sent to the switch 13 to switch to the second input channel, which in this case is the audio input channel 7. The audio input channel 7 receives the second input and the input will be converted, stored, and compared. The command determination device 21 may wait for the second input from the audio input channel 7, and when the input is received, the combining unit 25 may combine the two inputs into one. The decision unit 23 may determine whether the combined input corresponds to a complete control command. If a correspondence is found, then the control command is directed to the appropriate electronic device 3 and information that the command was sent to the electronic device 3 may be forwarded to one of the output devices 26 informing the user.

When the switching from one input mode to another occurs, the process does not return to the beginning of the command dialogue. The switching of the input modes may take place in the middle of a dialogue where some of the information has already been provided. For instance, an instructional command to change the CD in a vehicle CD player may have occurred. Before the control system 1 receives the information identifying the next CD, the vehicle enters a high noise area. The control system 1 detects the noise, recognizes that the noise exceeds a threshold level for the audio input channel 7 and switches to the haptic input device 5 automatically. The control system 1 may output a message to the user informing the user of the change in input channels and instructs the user to input the information via the haptic input channel 5. The input data may include the remaining information including the identity of the CD. The command determination unit 21 receives the rest of the required commands including the identity of the CD and will determine if the message comprises a complete command for the CD player. The process of changing the CD may be performed without starting over at the beginning of the command dialogue.

Switch 13 may be configured to automatically switch from one input channel to the other input channel if the input commands are not recognized. The switching may take place when the system is in the audio input mode. In the audio mode, the interference or background noise may rise to a level that is higher than a predetermined threshold level. When the interference is higher than the predetermined level, the voice commands may not be understood and control of the electronic device 3 may become impossible. The switch 3 may automatically switch to the haptic mode and inform the user of the change.

The command determination device 21 may include a command combining unit 25. The combining unit 25 may combine the input received from the two input channels 5 and 7. Once the inputs are combined, the command determination unit 21 may determine whether the combined command is proper. Even when a command is received from the two input channels, the combining unit 25 may provide one integrated set of instructions to the electronic device 3. The combining unit 25 may include another memory that stores the partially received instructions and commands. Since the combining unit 25 may receive the commands and instructions from a series of incremented input steps from the user, the inputs may come from the haptic input channel 5 and/or the audio input channel 7. The command determination device 21 may compare the input received from the different input channels 5 and 7 after the combining unit 25 combines the inputs.

The command determination device 21 may determine whether the input is consistent, meaning that there is no overlap of information or information missing that will interfere with the execution of the command. The lack of or the repetition of information may result from the switching of the input channels 5 and 7, and any confusion of the operator who may have been otherwise occupied while attempting to input information. If a command is valid, the command determination device 21 directs the instructions to the appropriate electronic device 3. If the command determination device 21 identifies an inconsistency, the user will be informed via one of the output devices 26.

The output device 26 may include a speaker system and a multimedia display. The speaker system may be integral or a unitary part of the control system 1 or to a vehicle information and entertainment system. The speakers may be connected to a car radio and/or an audio system. The multimedia display may be provided as part of the control system 1 or as part of an electronic device 3. The electronic device 3 may be a navigation system or a DVD player having the display. The control system 1 may use the speaker system or multimedia display to output messages to the user giving instructions or providing status about the ongoing speech dialogue with the control system 1.

For example, the control system 1 may output a message that informs the user that there is high background noise making the acoustic commands from the user unintelligible and the switch 13 has changed the input channel from the audio input channel 7 to the haptic input channel 5. Other types of messages also may be displayed. Audio prompts from the control system 1 may be heard through the speaker system. The prompts also may be displayed. Messages such as "please provide input via the keyboard" or "acoustic input not possible, please use keyboard" may be displayed when the audio input channel is deactivated and the haptic input channel has been automatically activated.

Figure 3:
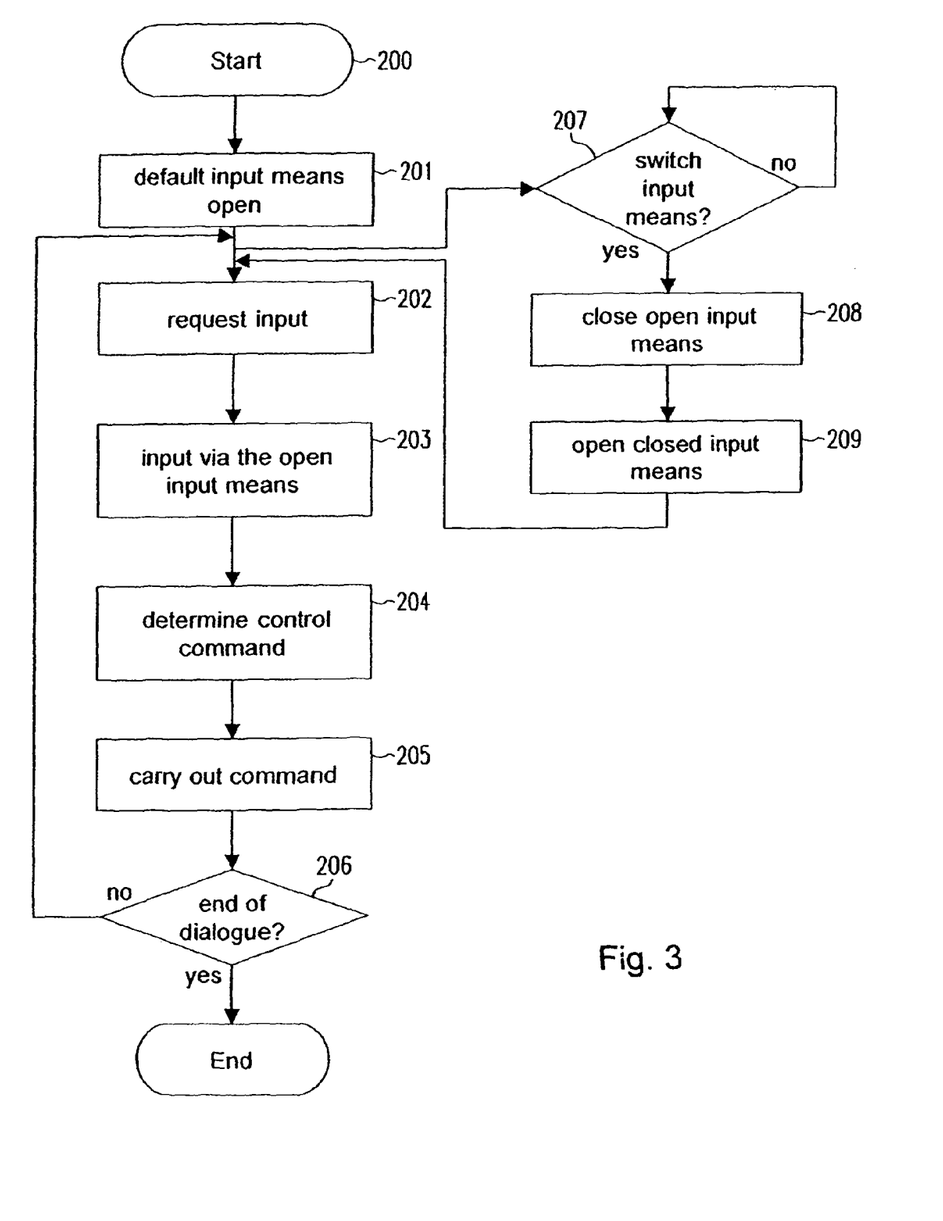
FIG. 3 is a flow diagram of an exemplary method of inputting data.

FIG. 3 is a flow diagram of a method for inputting data into the control system 1 to control an electronic device 3. The method will be described using the control system 1 in FIG. 1 for controlling at least one electronic device 1. It is, however, understood that the use of the control system 1 is one possibility and that other embodiments may also be suitable for carrying out the method for inputting data.

The method receives inputs in the form of data, information and commands via a haptic input channel 5 or audio input channel 7. Both of the input channels 5 and 7 are connected to a switch 13 that allows for the switching from one input mode to another at any time. The switching may be initiated by the user or by the control system 1. The control system 1 may initiate a switch when the commands are not understood through one of the input modes. The control system 1 automatically switches to the other input channel without the need to restate a command.

A dialogue is started by the user making a request for control of an electronic device 3 (act 200). The request may be a voice command or the activation of a switch. The user may begin by inputting at least one command to control the desired electronic device 3. Input channels 5 and 7 may activate and become the default input channel for the control system 1 for data input (act 201).

By way of an example, when the user presses the push-to-talk lever, the default input channel becomes the audio input device 7 (act 201). If the user activates a control key 31 or a control key (not shown) on an electronic device 3, the control system 1 is configured to activate and open the haptic input channel 5 (act 201). The control system 1 now may receive data via the haptic input channel 5.

The control system 1 may request data from the user through the use of prompts (act 202). The request or prompt may be provided acoustically or visually via an output device 26. The control system 1 may receive the input data from the user via the activated input channel (act 203). The haptic input data may be an electrical signal or signals from a keyboard, key, or touch screen. The audio input data may be sounds corresponding to a word or a number of words forming a phrase which may be understood by the speech recognition device 11. The input data may be converted to a recognized data format before it is received by the command determination device 21.

The input data may be analyzed with the command determination device 21 that determines whether there is a corresponding control command for the input (act 204). If the input is a valid and recognized command, the identified control command is then directed to the electronic device 3 where the command is carried out (act 205). The control system 1 checks whether the end of the speech dialogue has been reached (act 206). If the end has not been reached then acts 202 to 205 are repeated until the end of the dialogue. If the end of the dialogue has been reached, then the dialogue ends.

In parallel to the reception of the dialogue, the control system 1 continuously monitors whether a switching command has been provided to the switch 13 (act 207). When the switching command is received at the switch 13, the currently active, or the first input channel, is disabled (act 208). The second input channel is enabled (act 209). The control system 1 continues to receive information and commands via the second input channel (act 202). No further information will be input to the control system 1 through the formerly active or first input channel unless another switching command is received by the control system 1.

Figure 4:
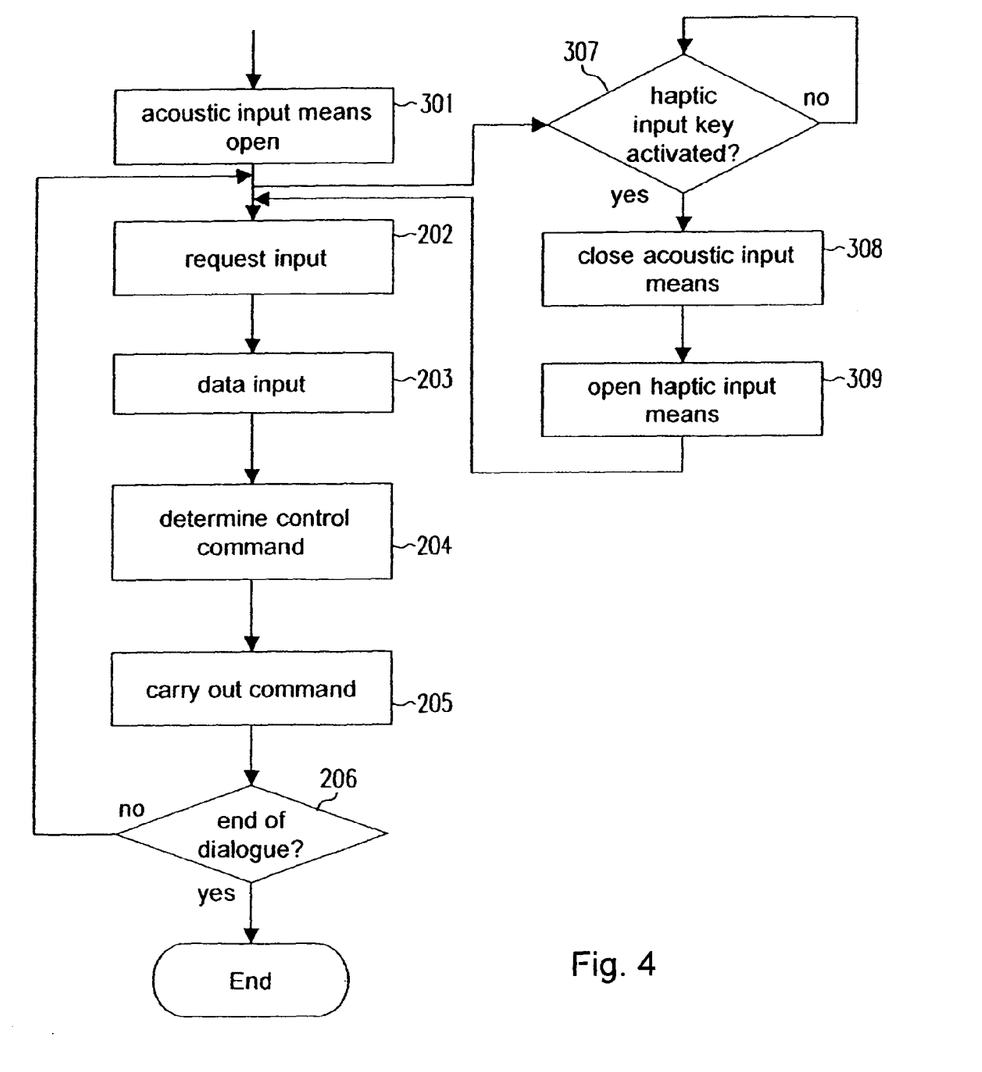
FIG. 4 is a flow diagram of an exemplary input channel selection.

FIG. 4 is another method for inputting data using the control system 1. The control system 1 begins by receiving inputs through the audio input channel 7 (act 301). In parallel to the acts described in steps 202-206 in FIG. 3, the control system 1 continuously checks whether a control key 31, connected to the haptic input channel 5, has been activated (act 307). If the control key 31 is not activated, the control system 1 will continually monitor the control key 31, or keys connected to the electronic device 3, until a key is activated (act 307). When any control key for the haptic input channel is activated, the control system 1, using the switch 13, will de-activate the audio input channel 7 so that audio input channel no longer receives input data (act 308). The control system 1 activates the haptic input channel 5 and the input data is received (act 309) through this channel 5.

As an example, the user may wish to utilize a telephone connected to the control system 1. The user may activate the push-to-talk lever to start the application. The user then may inform the control system 1 that the phone is needed by providing the spoken input "telephone call." The user may decide to input the telephone number via the keyboard of the telephone (not shown) and not through the audio input channel 7. By pressing the first number of the telephone number, the control system 1 will switch from the acoustic input channel 7 to the haptic input channel 5. The user may continue inputting the telephone number via the keyboard on the telephone. In this example, the pressing of the first number has two functions. The first function switches from the audio input channel 7 to the haptic input channel 5, and the second function provides at least the first digit of the complete telephone number.

Figure 5:
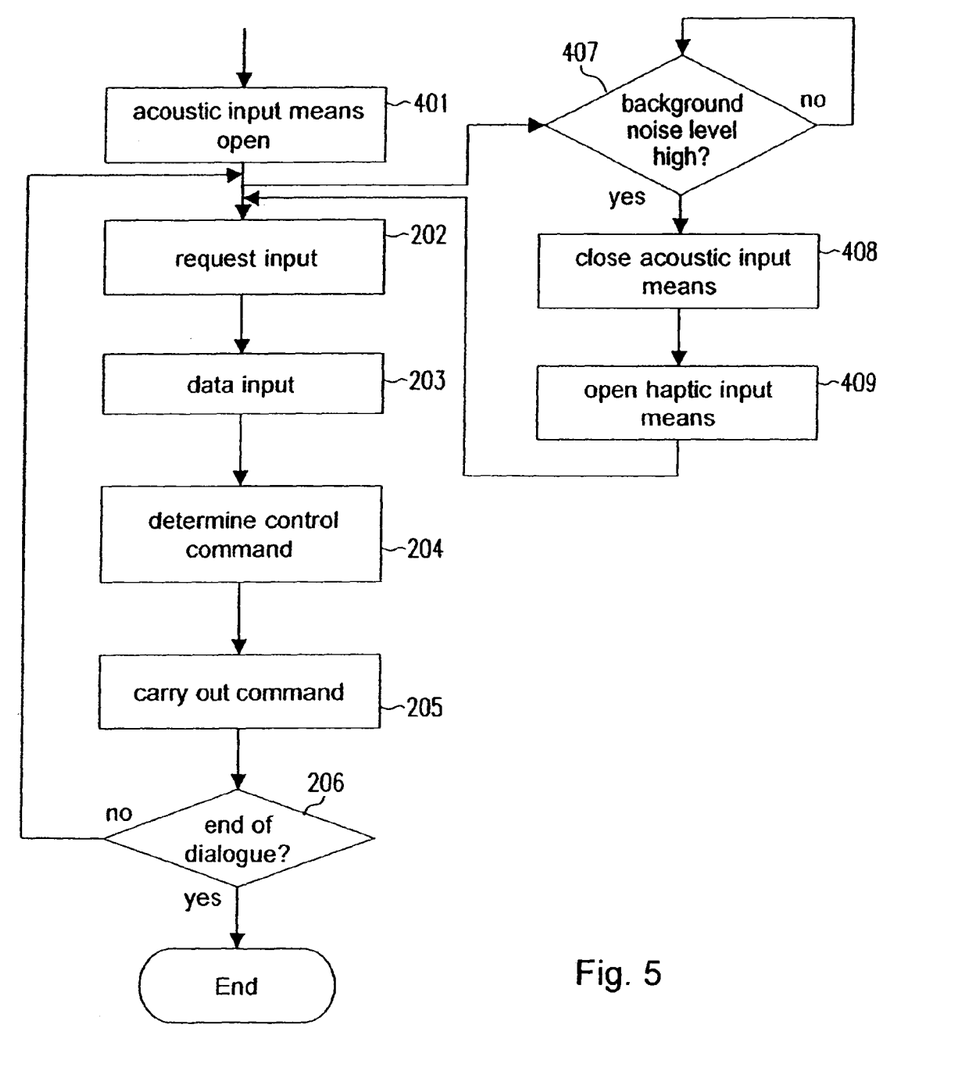
FIG. 5 is a second flow diagram of an alternate channel selection.

FIG. 5 is a block diagram of the method for inputting data to the control system 1 with the automatic switching of the input channels 5 and 7. The audio input channel 7 is activated (act 401). The control system 1 of FIG. 1 receives input data through the audio input channel 7 during actions 202-206. In parallel to actions 202-206, the control system 1 may be configured so that the speech recognition unit 11 in the audio input channel 7 compares the background noise level against a predetermined threshold (act 407). If the background noise rises to a level greater than the threshold, that noise level may provide difficulty for the speech recognition unit 11 to identify or recognize the speech commands. If the background noise level remains lower than the predetermined threshold value, then the speech recognition device 11 will continually or periodically monitor and compare the background noise to the predetermined threshold level (act 407). The noise level may rise at any time, especially when the control system 1 is used in a vehicle. The noise level can suddenly rise for many reasons, such as when the vehicle enters a tunnel, when a window is opened with the vehicle at a relatively high speed, or when several people inside the vehicle are talking at once.

When a high background noise level is detected, the switch 13 deactivates the audio input channel 7 so that speech inputs are no longer received through the audio input channel 7 (act 408). The haptic input channel 5 is activated for receiving input data (act 409). One or both of the output devices 26 may inform the user that the background noise level has increased and that the audio input channel 7 is no longer active and the haptic input channel 5 is active.

Figure 6:
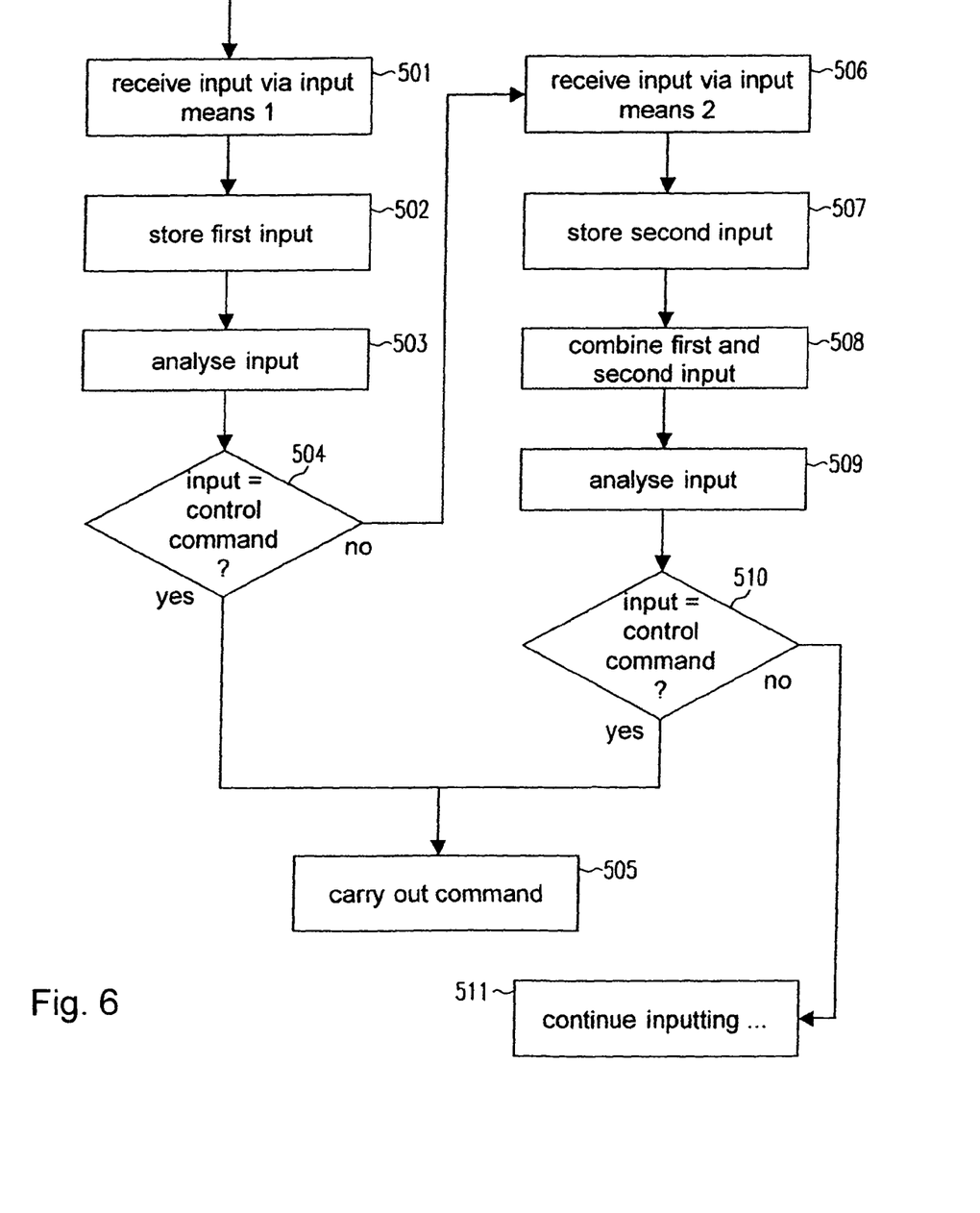
FIG. 6 is a flow diagram of a control method.

The control system 1 may receive data through either input channel 5 and 7 (act 501) as shown in FIG. 6. The input data may be formed into a recognized data format in the converter 15 and 17 associated with the input channel 5 and 7 and stored in a storage device 19. The command determination device 21 analyzes the input data and the decision unit 23 determines whether the provided input corresponds to a control command for controlling the electronic device 3 (act 504). The decision unit 23 may determine whether more input data is necessary to complete the control command (act 504). If the input data corresponds to a control command, the command determination unit 21 outputs and directs the control command to the designated electronic device 3 (act 505). The electronic device 3 will implement the control command.

On the other hand, the decision unit 23 may determine that the input data does not correspond to a control command (act 504). The control system 1 may utilize the switch 13 to change input channels 5 and 7, activating the second channel and de-activating the first channel. The control system 1 then may receive a second input through the second input channel (act 506). The second set of input data, after a conversion to the common data format in a converter 15 and 17, is stored in the memory device 19 (act 507). The first data input and the second data input are then combined into one input by the combining unit 25 (act 508). The combined input is then analyzed by the decision unit 23 (act 509). If the decision unit 23 determines that the combined input corresponds to a control command, the control command is output by the command determination device 21 and directed to the appropriate electronic device 3 (act 510). If the input is incomplete, the control system 1 may continue receiving input data according to the steps previously described (act 511).

Each of the described methods may operate independently or simultaneously. The acts may occur expressly or partially in parallel. For instance, the background noise for the audio channel may be checked while the audio input channel 7 is active, and then disabled when the haptic input channel 5 is active. However, the control system may still determine whether the data from one of the input channels 5 and 7 matches predetermined commands regardless of the input channel that is currently active and upon receiving an input that may not be recognized, the control system 1 will switch input channels using the switch 13. The methods may include the action of storing the input received through either the haptic input channel 5 or the audio input channel 7 prior to the action of determining the control command. The input received from one input channel 5 and 7 may be compared with the input received via the second channel 7 and 5. The input data then may be checked for inconsistencies resulting from the different input modes.

The methods also may include the step of deciding whether the first input data received from one input channel 5 and 7 is sufficient to form a complete control command or whether a second input message from the second input channel 7 and 5 is necessary to form the complete control command. If the message is not complete, eventually a message or a signal may be provided to the user informing him that an input is lacking in order to carry out the command. This action will be explained below by way of an example.

The method of FIGS. 3, 4, and 5 may further include the action of outputting a message or signal using visual and/or audio output device 26. When the switch 13 automatically switches from the acoustic input channel 7 to the haptic input channel 5 due to a high background noise level, a signal may be sent to the user. The signal may be audible or visual. If audible, the message could be a voice or an associated tone indicating that the switching of the input channels took place. If visual, the message may be displayed on a multimedia screen.

The multimedia screen may be an output device 26 that is part of the control system 1 or a part of one of the electronic devices 3 that has been configured for displaying messages from the control system 1. In the event of high background noise, the user may be informed that the audio input channel is no longer accepting voice inputs, and that the user should use controls (keyboard, control keys, etc.) connected to the haptic input channel 5. The control system 1 also may display a part of the input that the user previously entered into the control system 1. For example, the apparatus may recite or display a telephone number or a target location that the user has already entered.

The control system 1 and the methods of inputting data may be adapted for vehicles. It may be important that an operator of a motor vehicle keep his hands on the steering wheel to maintain control. Therefore, the operator may need to control the control system 1 and electronic devices 3 in the vehicle in a flexible and safe manner. However, the control system 1 may be employed for any electronic device 3 or system that interfaces with a user in other environments, too.

Since the apparatus provides a haptic input channel 5 and an audio input channel 7, the user can always opt for the input mode most convenient for the user. The switch 13 may provide the user with the possibility of switching at any time between at least two input channels 5 and 7. The switch 13 may allow the control system 1 to receive the input data from the user through only one of the input channels at a time. Thus, there may be a clear separation between the haptic input channel 5 and the audio input channel 7 which may provide an ergonomic advantage for carrying out speech dialogues between a user and a control system 1. For example, the mixing of haptic and audio inputs at the same time may lead to a malfunction of the control system 1 since the control system will not know whether it should consider all inputs, the audio inputs only, or the haptic inputs only. Thus, it may be possible to provide input in an easy, flexible and user-friendly way, whereby unintentional handling errors are reduced.

In one use, a user may press a push-to-talk lever activating the control system 1. When the user presses the push-to-talk lever, the control system 1 may enter the audio input mode. The switch 13 connects the audio input channel 7 to the converter 17. At the same time, the connection between the haptic input channel 5 and the converter 15 may be disconnected. The symbol "X" in FIG. 1 indicates the de-activation of haptic input channel 5.

In the audio mode, the user may speak a command for the CD changer to switch from a first CD to a second CD. The user then omits the speech command directing the playing of the second CD. Instead, the user pushes the play key on the CD player. The switch 13 automatically switches from the audio input channel 7 to the haptic input channel 5 and the CD player starts playing the second CD. The user does not have to think about providing a dedicated switching command either by speech or by pressing a dedicated switch key, the user can proceed naturally. This example illustrates that the action of switching to the haptic input channel 5 channel that upon activating a key on an electronic device 3 the switching occurs. The user does not have to recall that a special key or an announcement of a special command must be performed. The user may press the key on one of the electronic devices 3 to provide the final actions for controlling the electronic device 3.

The command determination device 21 may include a decision unit 23 that is configured to determine whether the control command for the above example will provide the same result. For example, the user may audibly provide the command to change the CD to the control system 1. Then the user provides the identification of the new CD through the haptic input channel 5. The decision unit 23 determines that the audible input was not sufficient to carry out the command. The decision unit 23 then has the switch 13 change input channels, from the audio input channel 7 to the haptic input channel 5 and waits for the second input identifying the second CD and the play command. Eventually, the control system 1 may output a signal or message to the user informing him that he is still lacking an input to carry out the command if the second command is not received in a timely fashion.

The control system 1 may include a computer program or software product that includes one or more computer readable media that has computer executable instructions for performing the actions described above. In particular, the computer program may provide instructions to the control system 1 for switching from one input channel to a second input channel without losing the data that was submitted and received by the control system 1. The control system 1 may switch from an audio input channel 7 to a haptic input channel 5 when the data that was input by the audio input channel 7 is not recognized by the control system 1. The computer program product may provide a predetermined background noise level that when exceeded causes the control system 1 to switch from the audio input channel 7 to the haptic or tactile input channel 5. Further, the computer program may provide instructions to the control system for the allowing the user to change input channels providing the user with an efficient and convenient method for delivering the required input necessary to control an associated electronic device 3.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A control system comprising:
    a haptic input channel for receiving input data from a user;
    an audio input channel for receiving input data from the user;
    a switch coupled to the audio input channel and the haptic input channel, where the switch activates one of the audio input channel and the haptic input channel responsive to the input data, and where the haptic channel is deactivated when the audio channel is activated by the switch, and where the audio channel is deactivated when the haptic channel is activated by the switch; and
    a command determination device coupled to the haptic input channel and to the audio input channel, where the command determination device determines a control command from the input data and directs the control command to an electronic device in a vehicle, where the command determination device further includes a combining unit that combines the input data into the control command where a art of the control command was input data received from the haptic input channel and another part of the control command was input data received from the audio input channel.

2. The control system of claim 1, further comprising an output device coupled to the command determination device for providing information to the user.

3. The control system of claim 2, where the output device further comprises a display or a speaker or both the display and the speaker.

4. The control system, of claim 3, where the display or the speaker or both the display and the speaker are coupled to the electronic device.

5. The control system of claim 3, where the display displays the input data.

6. The control system of claim 5, where the display or the speaker or both the display and the speaker is configured to output a signal when the switch selects an input channel.

7. The control system of claim 1, where the command determination device includes a decision unit that determines whether the control command is recognized from a first input data received from the haptic input channel and the audio input channel.

8. The control system of claim 1, where the command determination device determines whether the combined input data is a recognized control command.

9. The control system of claim 1, where the audio input channel includes a speech recognition device.

10. The control system of claim 1, where the switch comprises a circuit that chooses one or more states for isolating the haptic input channel and the audio input channel, and where the haptic input channel is deactivated when isolated, and where the audio input channel is deactivated when isolated.

11. The control system of claim 1, where the switch is configured to switch from the audio input channel to the haptic input channel when the audio input channel is active and a background noise level is higher than a predetermined threshold.

12. The control system of claim 1, where the haptic input channel comprises a control key and the switch is configured to switch to the haptic input channel upon activation of the control key.

13. The control system of claim 1, further comprising a memory for storing the input data received from the haptic input channel and the audio input channel.

14. A method for receiving control data for controlling an electronic device in a vehicle comprising:
    receiving input data through a first input channel comprising a haptic input channel or an audio input channel;
    de-activating the first input channel and activating a second input channel when a switching command is received from a user or from a control system when the control system determines that the input data is not a recognized control command for the electronic device, where the second channel is the haptic input channel when the first channel is the audio input channel, and where the second channel is the audio input channel when the first channel is the haptic input channel;
    receiving second input data through the second input channel;
    combining the input data received from the first input channel with the second input data received from the second input channel prior to determining the control command; and
    determining a control command from the input data from the first input channel combined with the second input data received from the second input channel.

15. The method of claim 14, where de-activating further comprises de-activating the audio input channel, comprising switching to the haptic input channel upon activation of a control key where the control key is coupled to the haptic input channel.

16. The method of claim 14, further comprising monitoring the background noise level when the audio input channel is active.

17. The method of claim 16, further comprising detecting a background noise level greater than a predetermined level.

18. The method of claim 17 where switching further comprises automatically switching from the audio input channel to the haptic input channel when the background noise level is greater than the predetermined threshold level.

19. The method of claim 14, further comprising outputting a signal to an output device when either switching from the haptic input channel to the audio input channel or switching from the audio input channel to the haptic input channel.

20. The method of claim 14, further comprising the step of:
    outputting the control command to an electronic device.

21. The method of claim 20, further comprising the step of:
    requesting a second input through the second input channel when the control command is not recognized.

22. The method of claim 14, further, comprising storing the input data.

23. The method of claim 14, further comprising outputting the input data using a display or a speaker or both the display and the speaker.

24. A control system comprising:
means for receiving haptic input data from a user;
means for receiving audio input data from the user;
means for switching between the means for receiving haptic input data and the means for receiving audio input data, the means for switching being coupled to the control system, the control system providing the input data to an electronic device in a vehicle to control the operation of the electronic device, where the means for switching activates either the means for receiving audio input data or the means for receiving haptic input data responsive to the input data received from the user; and
a command determination device combines the input data where a part of the input data was received from the means for receiving haptic input data and another part of the input data was received from the means for receiving audio input data.

25. The control system of claim 24, where the means for switching is configured to select the means for receiving audio input data or the means for receiving haptic input data if an interference is greater than a predetermined threshold level.

26. The control system of claim 24, where the control system determines whether a control command is recognized for the electronic device from the input data received from the means for receiving haptic input data and the means for receiving audio input data, and where the control system directs the control command to the electronic device when the control command is recognized.

27. The control system of claim 24, where the control system determines whether a control command is recognized from a first input data received from the means for receiving haptic input data or the means for receiving the audio input data and whether a second input data from a second means for receiving input data is necessary to determine the control command where the second means is the means for receiving haptic input data or the means for receiving audio input data.

* * * * *

UNITED STATES PATENT AND TRADEMARK OFFICE
CERTIFICATE OF CORRECTION

| | | |
|---|---|---|
| PATENT NO. | : 7,761,204 B2 | Page 1 of 1 |
| APPLICATION NO. | : 11/045852 | |
| DATED | : July 20, 2010 | |
| INVENTOR(S) | : König | |

It is certified that error appears in the above-identified patent and that said Letters Patent is hereby corrected as shown below:

At column 11, line 38, claim 1 "command where a art of the control command..." should be changed to --command where a part of the control command...--

Signed and Sealed this
Fourth Day of January, 2011

David J. Kappos
*Director of the United States Patent and Trademark Office*